United States Patent [19]

Bugni

[11] Patent Number: 5,012,330

[45] Date of Patent: Apr. 30, 1991

[54] ARTIFICIAL FRONT PORCH INSERTION CIRCUIT

[75] Inventor: Anthony R. Bugni, Knoxville, Tenn.

[73] Assignee: North American Philips Corporation, New York, N.Y.

[21] Appl. No.: 393,339

[22] Filed: Aug. 14, 1989

[51] Int. Cl.⁵ .......................... H04N 5/16; H04N 9/72
[52] U.S. Cl. ...................................... 358/34; 358/171; 358/17
[58] Field of Search ...................... 358/17, 34, 171, 33

[56] References Cited

U.S. PATENT DOCUMENTS

| | | | |
|---|---|---|---|
| 4,215,371 | 7/1980 | Baggett et al. | 358/172 |
| 4,295,155 | 10/1981 | Jarger et al. | 358/17 |
| 4,663,659 | 5/1987 | Blatter | 358/19 |

Primary Examiner—John W. Shepperd
Attorney, Agent, or Firm—Edward W. Goodman

[57] ABSTRACT

A circuit for ensuring that the level of the front porch of each line in a color video signal is at a predetermined proper level includes a circuit for detecting the position of the horizontal synchronization pulse in each line, a circuit for generating an artificial front porch signal, and a controllable switch connected to receive the color video signal and the artificial front porch signal. The controllable switch, under the control of the detecting circuit, provides a signal for a subsequent color decoder circuit in which the front porch in each line in the color video signal is replaced by the artificial front porch signal.

6 Claims, 2 Drawing Sheets

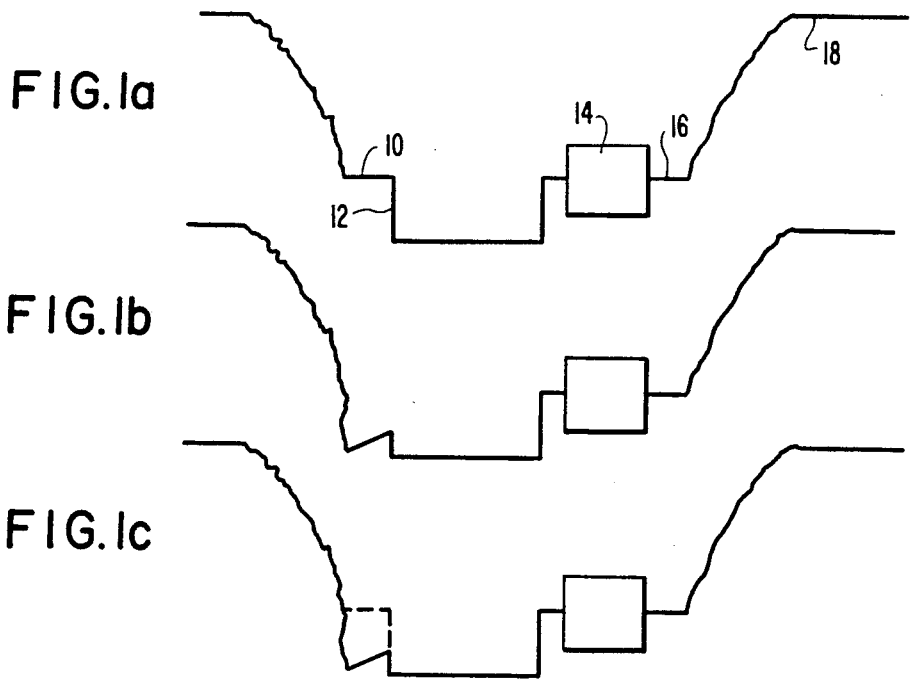
FIG.1a
FIG.1b
FIG.1c
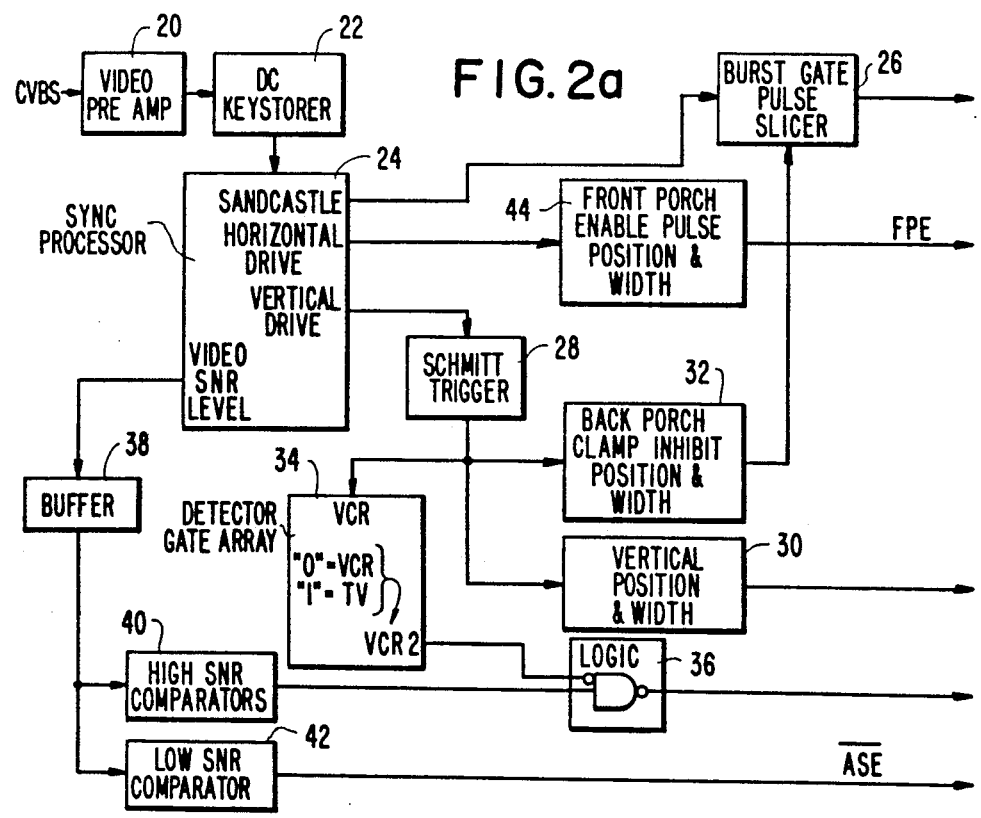
FIG.2a

ARTIFICIAL FRONT PORCH INSERTION CIRCUIT

BACKGROUND OF THE INVENTION

1. Field of the Invention

The subject invention relates to a circuit for modifying a color video signal, and more particularly, to a circuit for assuring that the front porch portion of a color video signal is at an appropriate signal level to allow for proper decoding of the video signal.

2. Description of Related Art

In color television, horizontal synchronization and color information is coded and included in the video signal. In order for a decoder in the television receiver to properly decode this color information, it is necessary for the decoder circuitry within the television receiver to properly synchronize itself with the transmitted color video signal.

FIG. 1a shows the video signal for a single horizontal scanning line of a typical color video signal. This scanning line includes a front porch area 10 followed by the horizontal synchronizing pulse 12. The pulse 12 is then followed by the color burst 14, the back porch area 16 and the video information 18 for the line. The color burst 14 contains the necessary information enabling the decoder to decode the color video signal. Hence, as indicated above, in order for the receiver to properly decode the signal, it is essential for the decoder circuitry to accurately detect the position of the horizontal pulse.

FIG. 1b shows a video signal similar to that shown in FIG. 1a with the exception that the front porch area 10 is sagging, that is, at a much lower level than in FIG. 1a. This situation may occur in the playing back of certain video tapes on a video cassette recorder. While prior art analog television receivers could adequately compensate for this lowered front porch, present day television receivers using digital circuitry in the decoder encounter problems with this sagging front porch signal which results in the digital synchronization processor in the decoder not being able to distinguish the actual beginning of the horizontal synchronizing pulse causing a large saturation change and a loss of horizontal synchronization. This appears as either severe horizontal tearing or slanted noisy black bars on the display screen of the television receiver.

SUMMARY OF THE INVENTION

It is an object of the present invention to provide a circuit for ensuring that the level of the front porch of a color video signal is at its proper level.

The above object is achieved in a circuit comprising means for detecting the beginning of the front porch in a color video signal and for providing a control signal for a predetermined period of time; means for generating an artificial front porch signal having a signal level at a predetermined proper level; and switching means coupled to receive said color video signal and said artificial front porch signal, said switching means applying said color video signal or, alternatively, in response to said control signal, said artificial front porch signal to a color decoder circuit.

Arranged as such, the circuit of the subject invention assures that the front porch of each line in the color video signal is at the proper level by substituting an artificial front porch signal for that present in the color video signal at the appropriate instant as shown in FIG. 1c.

BRIEF DESCRIPTION OF THE DRAWINGS

With the above and additional objects and advantages in mind as will hereinafter appear, the invention will be described with reference to the accompanying drawings, in which:

FIGS. 1a–1c show various waveforms of single lines in a color video signal;

FIG. 2a shows a functional block diagram of a synchronization circuit for use with the subject invention, while

DESCRIPTION OF THE PREFERRED EMBODIMENT

Figure 2B:
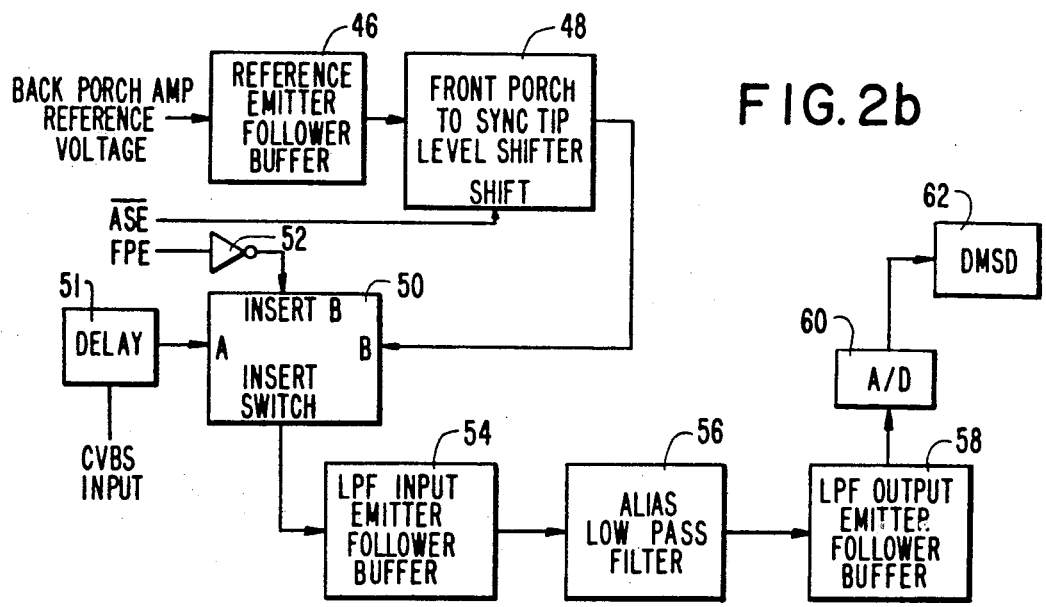
FIG. 2b shows a functional block diagram of a front porch insertion circuit.

FIG. 2a shows a functional block diagram of a known synchronization circuit duly modified to provide the timing pulses for the front porch insertion circuit of the subject invention. The synchronization circuit includes a video pre-amplifier 20 for receiving the color video signal. After being applied to a DC restoration circuit 22, the video signal is applied to a synchronization processor IC 24 for generating the synchronizing signals for the television receiver. This synchronization processor 24, which may be part no. TDA2579, as identified in the Philips Data Handbook, No. ICO2b, 1988, has a sandcastle pulse output which is applied to an input of a burst gate pulse slicer 26, and a vertical drive output which is applied to a Schmitt trigger 28. The output from the Schmitt trigger 28 is applied to a vertical position and width circuit 30 and to a back porch clamp inhibit position/width circuit 32, the output from which is used to control the burst gate pulse slicer 26. The output from the Schmitt trigger 28 is also applied to a VCR detector gate array 34 which applies its output to the inverting input of a NAND gate 36. The synchronization processor IC 24 also has a video SNR level output which is applied through a buffer 38 to a high SNR comparator 40 for application to the other input of NAND gate 36, and to a low SNR comparator 42 for providing an ASE control signal indicating that the video signal is either very noisy or is missing.

The above synchronization circuit is known. However, for the subject invention, the horizontal drive output of the synchronization processor IC 24 is applied to a front porch enable pulse position/width circuit 44 which generates an FPE control signal for indicating when and for how long the artificial front porch signal is to be inserted.

FIG. 2b shows a block diagram of a front porch insertion circuit of the subject invention. A reference voltage, which may be identical with the back porch clamp reference voltage is applied to a reference emitter follower buffer 46 which applies its output to a front porch to sync. tip level shifter 48. The shift of this shifter 48 is controlled by the ASEcontrol signal from the low SNR comparator 42. The output signal from the shifter 48 is applied to one input of a controllable switch 50, the other input of which receives the color video signal via a one-line delay 51. The FPE control signal is then applied via an inverter 52 to the control input of the controllable switch 50. The output from the controllable switch 50 is applied to the series arrangement of an input emitter follower buffer 54, a low-pass filter 56 and an output emitter follower buffer 58. The output from this buffer 58 is then applied through an A/D converter 60 to a digital multi-standard decoder 62, which may be part no. SAA9050, as identified in the Philips Data Handbook, No. IC02a.

In operation, the synchronization processor IC 24 generates the horizontal drive output which is a stable signal and follows any horizontal jitter in the input color video signal. Based on this signal, the front porch enable pulse position/width circuit 44 determines the appropriate starting position of the front porch area in the next line and generates the FPE signal of the proper length. At the same time, the above-noted reference voltage is applied to the reference emitter follower buffer 46 which generates the appropriate artificial front porch signal and applies this signal, through the front porch to sync. tip level shifter 48, to input B of the controllable switch 50. When the FPE signal goes high, the controllable switch 50 selects this artificial front porch signal and applies the same to its output. Otherwise, the controllable switch 50 selects the input color video signal applied to input A.

Since the front porch enable pulse position/width circuit 44 determines the starting position of the front porch in the next line, delay circuit 51, having a one-line delay, may optionally be inserted at the CVBS input of the switch 50 so that the front porch of the current line, as opposed to the next line, is to be replaced.

In the event of a very noisy or no input color video signal, the $\overline{ASE}$control signal is generated which causes the front porch to sync. tip level shifter 48 to shift the level of the artificial front porch signal to that of the sync. tip. This is done to force the decoder 62 to lock its horizontal phase locked loop (HPLL) to this artificial sync. signal thereby preventing the HPLL from drifting too low in frequency which would, in turn, cause the high voltage to go too high causing possible damage to the circuitry.

Figure 3:
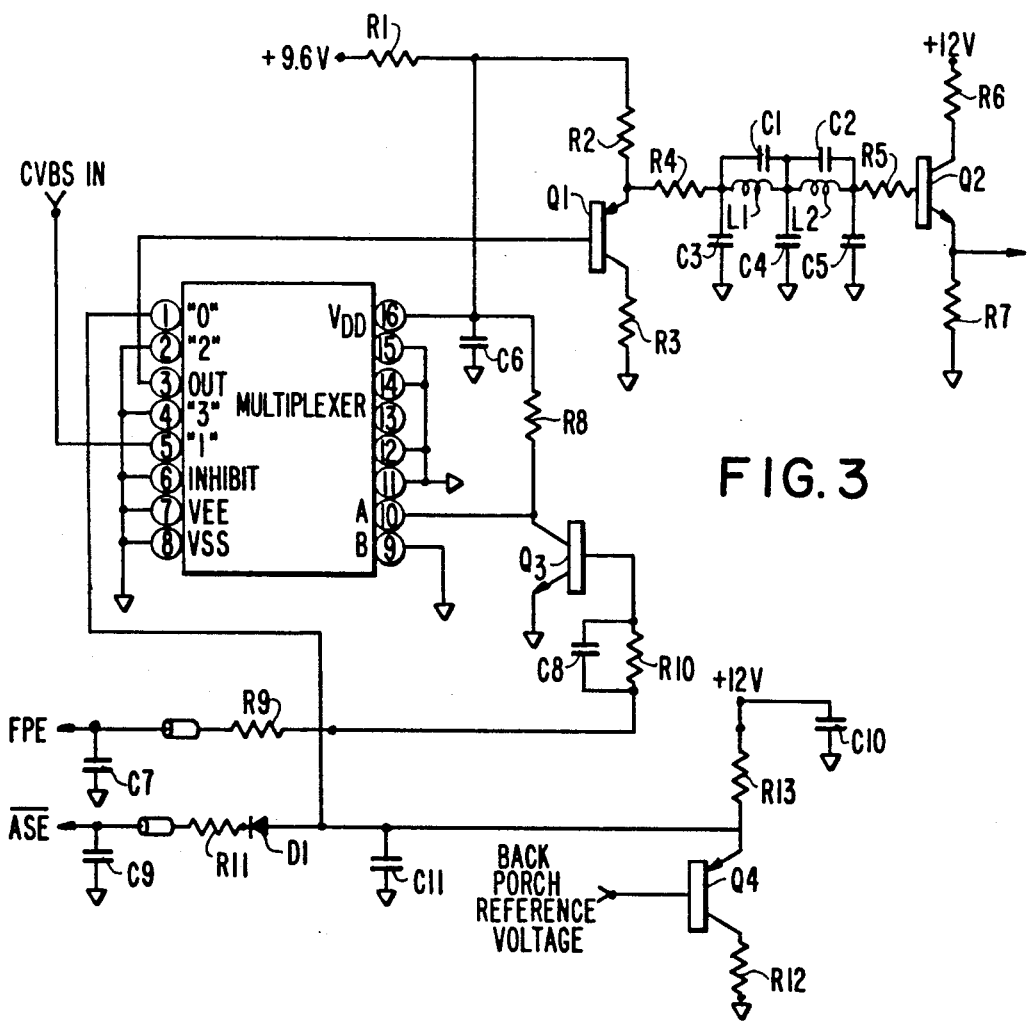
FIG. 3 shows a schematic diagram of the front porch insertion circuit of FIG. 2b.

FIG. 3 shows a circuit diagram of the front porch insertion circuit of FIG. 2b. A supply voltage is applied through the series arrangement of resistors R1 and R2 to the emitter of an NPN transistor Q1, the collector of which is connected to ground through a resistor R3, forming the input emitter follower buffer 54. The emitter of transistor Q1 is also connected to the series arrangement of resistor R4, inductors L1 and L2, and resistor R5, to the base of transistor Q2. The inductors L1 and L2 are shunted by capacitors C1 and C2, respectively. In addition, capacitors C3, C4 and C5 connect the junctions between resistor R4/L1, L1/L2 and L2/R5 to ground. A supply voltage is applied to the collector of transistor Q2 through a resistor R6, the emitter of which is connected to ground by a resistor R7. The emitter of transistor Q2 provides the output of the front porch insertion circuit. The components R4, R5, C1-C5, L1 and L2 for the low-pass filter 56, while the components R6, R7 and Q2 form the output emitter follower buffer 58.

The color video signal is applied to one input of the controllable switch 50 which may be a dual 4-channel analog multiplexer/demultiplexer, part no. 74HC4052, Philips Data Handbook No. IC06, 1988. The junction between resistors R1 and R2 is connected to ground through a capacitor C6 and to a supply voltage input of the controllable switch 50. This supply voltage input is also connected, through a resistor R8, to a select input of the controllable switch 50 and to the collector of an NPN transistor Q3, the emitter of which is connected to ground. The FPE control signal is shunted to ground by a capacitor C7 and is connected to the base of the transistor Q3 through a resistor R9 and the parallel arrangement of a resistor R10 and a capacitor C8. The output of the controllable switch 50 is connected to the base of transistor Q1.

The $\overline{ASE}$control signal is shunted to ground by a capacitor C9 and is connected, through the series arrangement of a resistor R11 and a reverse-biased diode D1 to the emitter of a PNP transistor Q4, the collector of which is connected to ground by a resistor R12 and the emitter of which is also connected to a 12 v. supply by a resistor R13, the supply being grounded by a capacitor C10. The base of transistor Q4 receives the above-noted reference voltage. The emitter of transistor Q4 is further connected to ground by a capacitor C11 and to the second input of the controllable switch 50. The components R12, R13, C10 and Q4 form the reference emitter follower buffer 46, and the components R11, C11 and D1 form the front porch to sync. tip level shifter 48.

Values for the components in the above practical embodiment are as follows:

| R1 | 10 ohms | C1 68 pf |
| R2 | 910 ohms | C2 47 pf |
| R3 | 51 ohms | C3 22 pf |
| R4 | 270 ohms | C4 100 pf |
| R5 | 22 ohms | C5 220 pf |
| R6 | 100 ohms | C6 4.7 uf |
| R7 | 470 ohms | C7 220 pf |
| R8 | 2K ohms | C8 100 pf |
| R9 | 100 ohms | C9 220 pf |
| R10 | 8.2K ohms | C10 0.1 uf |
| R11 | 150 ohms | C11 0.1 uf |
| R12 | 100 ohms | L1 4.7 uH |
| R13 | 2.7K ohms | L2 10 uH |

Numerous alterations of the structure herein disclosed will suggest themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for ensuring that the level of a front porch in each line of a color video signal is at a predetermined proper level, said circuit comprising:

means for detecting the beginning of a front porch in a line of said color video signal and for providing a first control signal for a predetermined period of time in response thereto;

means for detecting whether said color video signal is missing or is very noisy and for generating a second control signal in response thereto;

means for generating an artificial front porch signal having a signal level at said predetermined proper level and, in response to said second control signal, at a second predetermined level substantially similar to the signal level of a horizontal synchronizing pulse in said color video signal; and switching means coupled to receive said color video signal and said artificial front porch signal, said switching means applying said color video signal or, alternatively, in response to said first control signal, said artificial front porch signal to a color decoder circuit, whereby the front porch in each line of said color video signal is replaced by said artificial front porch signal.

2. A circuit as claimed in claim 1, wherein said circuit further comprises delay means for delaying said color video signal for the duration of a single line prior to being applied to said switching means.

3. A circuit as claimed in claim 2, wherein each line in said color video signal includes a horizontal synchronization pulse following said front porch, and wherein said detecting means comprises a synchronization circuit for detecting said horizontal pulse and for generating a horizontal drive signal, and means for generating said first control signal in response to said horizontal drive signal.

4. A circuit as claimed in claim 1, wherein said circuit replaces the front porch in a line subsequent to the line in which the horizontal pulse is detected.

5. A circuit as claimed in claim 3, wherein each line in said color video signal includes a horizontal synchronization pulse following said front porch, and wherein said detecting means comprises a synchronization circuit for detecting said horizontal pulse and for generating a horizontal drive signal, and means for generating said first control signal in response to said horizontal drive signal.

6. A circuit as claimed in claim 5, wherein said first control signal generating means comprises delay means for delaying said horizontal drive signal for the duration of one of said lines in said color video signal less said predetermined time period, and means for generating said first control signal for said predetermined time period in response to said delayed horizontal drive signal.

* * * * *